United States Patent
Meunier

(10) Patent No.: US 6,355,376 B1
(45) Date of Patent: Mar. 12, 2002

(54) POSITIVE ELECTRODE MATERIAL BASED ON TITANIUM OXYSULPHIDE FOR ELECTROCHEMICAL GENERATOR AND METHOD FOR MAKING SAME

(75) Inventor: Georges Meunier, Saint Medard d'Eyrans (FR)

(73) Assignee: Centre Nationale de la Recherche, Paris (FR)

( * ) Notice: Subject to any disclaimer, the term of this patent is extended or adjusted under 35 U.S.C. 154(b) by 0 days.

(21) Appl. No.: 09/403,035

(22) Filed: Oct. 22, 1999

(30) Foreign Application Priority Data

Apr. 22, 1997 (FR) ............................................... 9704960

(51) Int. Cl.$^7$ .......................... H01M 4/58; H01M 4/26; C23C 14/34
(52) U.S. Cl. ................................ 429/218.1; 429/231.5; 429/245; 429/209; 204/192.12; 204/192.15; 29/623.1
(58) Field of Search ................................ 429/233, 234, 429/245, 209, 231.5, 218.1; 29/623.1

(56) References Cited

U.S. PATENT DOCUMENTS

| | | | |
|---|---|---|---|
| 4,066,824 A | 1/1978 | Rao et al. | |
| 4,243,624 A | 1/1981 | Jacobson et al. | |
| 4,508,608 A | 4/1985 | Palmer | |
| 4,555,456 A | * 11/1985 | Kanehori et al. | ........... 429/131 |
| 4,934,922 A | 6/1990 | Abraham et al. | |
| 5,147,739 A | 9/1992 | Beard | |
| 5,202,201 A | * 4/1993 | Meunier et al. | |

FOREIGN PATENT DOCUMENTS

WO    WO 90 05387    5/1990

OTHER PUBLICATIONS

Meunier, George, et al; "New Amorphous Titanium Oxysulfides Obtained in the Form of Thin Film", Thin Solid Films, vol. 205, No. 2, Dec. 1, 1991, pp. 213–217, XP000261323.
Jones, S D, et al: "Thin Film rechareable Li batteries", solid state Ionics, Diffusion & Reactions, Aug. 1994, Netherlands. vol. 69, No. 3–4, ISSN 0167-2738, pp. 357–369, XP002051779.

* cited by examiner

*Primary Examiner*—Carol Chaney
*Assistant Examiner*—Tracy Dove
(74) *Attorney, Agent, or Firm*—Oblon, Spivak, McClelland, Maier & Neustadt, P.C.

(57) ABSTRACT

The invention relates to a material for a positive electrode based on titanium oxysulphide for an electrochemical generator and its method of preparation.

This oxysulphide corresponds to the formula $TiO_aS_{3+b}$ in which a and b are such that:

$0 < a \leq 0.5$ $0 < b \leq 0.7$

This material can be obtained by radiofrequency cathode sputtering from a $TiS_3$ target and can be used as a cathode in an electrochemical generator comprising a lithium anode 9 and a glass electrolyte 7 of composition:

$1B_2O_3$—O, $8Li_2O$—O, $8Li_2SO_4$.

17 Claims, 3 Drawing Sheets

POSITIVE ELECTRODE MATERIAL BASED ON TITANIUM OXYSULPHIDE FOR ELECTROCHEMICAL GENERATOR AND METHOD FOR MAKING SAME

TECHNOLOGICAL FIELD

The object of this invention is a material based on titanium oxysulphide, which can be used, in particular as a positive electrode in an electrochemical generator or an electrochromatic cell.

In a more precise way, it relates to the creation of electrochemical generators or electrochromatic cells in particular in thin layers, whose principle of operation is based on the insertion and the removal of alkali metal ions or protons into and from the positive electrode.

Electrochemical generators of this type can find numerous applications, for example, in the form of micro-generators having a total thickness of a few µm in systems for providing back-up to the memories of micro-systems during a power failure or as integrated systems in cards with a memory of the bank card type.

These generators can also be used as an electrochromatic system when the positive electrode changes colour during the insertion, which makes them interesting for the display of information or better still when the negative electrode is transparent, for glazing that changes color according to needs.

STATE OF THE PRIOR TECHNOLOGY

Electrochemical generators of this type using a chalcide or an oxychalcide of titanium as a positive electrode, are described in particular, in the document WO-A-90/05387. In this document, the positive electrode material is made up of a layer of compound corresponding to the formula:

$$TiO_aX_b$$

in which X represents an atom of sulphur, selenium or tellurium and a and b are such that a is at the most equal to 2, b is at the most equal to 3 and (a+b) is between 2 and 3.

The layer is prepared by magnetron type cathode sputtering, from a titanium disulphide $TiS_2$ target containing 5% of oxygen atoms.

This electrode material has interesting electrochemical properties but its deposition by cathode sputtering, in the form of a thin layer, has the disadvantage of requiring the manufacture of $TiS_2$ targets, from commercial $TiS_2$ powders which always contain a few percent of oxygen. Indeed, because of the lamellar structure of $TiS_2$, the powder compacts rather easily but the sintering is delicate since there is a loss of sulphur whatever temperature is used. Because of this, during the cathode sputtering, the power applied to the titanium sulphide target has to be limited to a value below 2 Watts/cm² otherwise one risks seeing the target cleaved depending on the thickness.

Furthermore, although the performance of an electrochemical generator using this electrode material in the form of a thin layer is satisfactory, it would be of interest to further improve this performance, in particular the capacity of the generator per unit mass. Hence research has been undertaken to provide electrode materials of the same type under better conditions and to further improve the performance of the electrochemical generator using such electrodes.

The document U.S. Pat. No. 4,508,608 describes a method of preparation of a cathode based on a high porosity chalcide, by cathode sputtering of molecules of a transition metal chalcide onto and into a high porosity current collector substrate. The chalcide can be, in particular, a titanium sulphide such as titanium disulphide or trisulphide.

The energy per unit mass of titanium trisulphide (840 Wh/kg) is very high in relation to that of titanium disulphide (485 Wh/kg) but the use of $TiS_3$ poses certain problems since the insertion of lithium is only weakly reversible in $TiS_3$.

The precise object of this invention is a positive electrode material, based on titanium oxysulphide which gets around these disadvantages and which leads to a notable improvement in the performance of the micro-generator, in addition having the advantage that the electrodes in thin layers are suitable for manufacture on an industrial scale.

DESCRIPTION OF THE INVENTION

According to the invention, the positive electrode material for an electrochemical generator is made up of a thin layer of an amorphous compound of formula:

$$TiO_aS_{3+b}$$

in which a and b are such that:

$$0 < a \leq 0.5$$

$$0 < b \leq 0.7$$

According to the invention, thanks to the choice of an electrode material of the type $TiO_aS_{3+b}$ which can be deposited by cathode sputtering, one obtains a layer of isotropic and amorphous material of much lower density than that of massive $TiS_3$, which, because of this, stands up to the insertion and removal of alkali metal ions or protons very well. In effect, its low density corresponds to an expanded amorphous structure and there is no swelling of the material during the insertion of the ions. Hence, the layer does not deteriorate since the transport of the ions occurs without any change in the morphology. This isotropic layer also offers the advantage of allowing good diffusion of lithium in all directions.

According to the invention, this thin layer of titanium oxysulphide corresponding to the formula mentioned above can be prepared by radiofrequency cathode sputtering from a $TiS_3$ target. In the $TiS_3$ compound, the titanium atom is tetravalent as in $TiS_2$ and the sulphur is present in the form of a sulphide and a disulphide group: $Ti^{4+}S^{2-}S_2^{2-}$.

For this deposition, the use of a $TiS_3$ target is of particular interest since $TiS_3$ can be obtained easily by chemical reaction of titanium and sulphur in powder form, in stoichiometric quantities, in a sealed tube under vacuum at 500° C. Under these conditions, a black coloured $TiS_3$ powder is obtained, the spectrum X of which corresponds to that of $TiS_3$. This powder can be easily compacted, for example, under a pressure of 294 MPa (3 tonnes/cm²) and sintered, for example, at a temperature of 500° C., in a sealed tube under vacuum. Hence, one can manufacture targets of much larger diameter, for example from 50 to 75 mm diameter, than is the case for $TiS_2$ targets. Also, this method can be implemented on an industrial scale for the manufacture of electrodes in thin layers, which was not possible with the method of the prior art using a $TiS_2$ target, because of the need to limit the power applied to the $TiS_2$ targets.

An object of the invention is also an electrochemical generator using the positive electrode material mentioned above. This generator comprises a positive electrode, a negative electrode capable of liberating a proton or an alkali metal ion and an ion conducting electrolyte arranged between the two electrodes, and is characterised in that the positive electrode is formed from a thin layer of an amorphous compound of formula:

$$TiO_aS_{3+b}$$

in which a and b are such that:

0<a≦0.5

0<b≦0.7 said layer being arranged on a substrate.

The substrates used to support the thin layer of amorphous compound can be very diverse, conductors or insulators, flexible or rigid. Generally, one uses a substrate that conducts electricity or an insulating substrate covered with a layer of an electrically conductive material onto which the thin layer of the compound $TiO_aS_{3+b}$ is arranged.

The electrically conductive material can be, in particular, a metal, for example Cr, Pt, Ni, Al etc. monocrystalline silicon or an oxide conductor of electricity like the mixed oxides of indium and tin (ITO).

The insulating support can be a ceramic material, Pyrex, a glass or a plastic material resistant to the cathode sputtering conditions, for example, a flexible plastic material such as a polyester like the polyterephthalate of ethylene glycol or a polyimide.

These flexible substrates allow, in particular, continuous production of large surface area electrodes since they can be passed continuously into the cathode sputtering deposition enclosure.

In the generator described above, the negative electrode can be produced, in particular, in lithium or in a material containing lithium. The material containing lithium can be an alloy of lithium or a lithium compound.

The negative electrode is preferably in the form of a thin layer deposited by traditional methods, for example by evaporation under vacuum or by cathode sputtering. Thin layers obtained by such methods are highly advantageous since the departure of the ions does not create any void at the interface.

The negative electrode can also be produced in an alloy or in a compound including other alkali metals, for example sodium, potassium, caesium or rubidium or in a compound capable of liberating protons like the metal hydrides such as $LaNi_5H_6$ and hydroxides such as iridium hydroxide.

When the negative electrode is made of lithium, a glass can be used as a solid electrolyte that conducts lithium ions. This glass must be an electronic insulator in order to prevent auto-discharge of the generator but its ionic conductivity must be the highest possible.

In effect, the electrolyte must play two essential roles: to be an excellent electronic insulator between the two electrodes, and to be a good ionic conductor. Its thickness must be sufficient and the layer must be absolutely free of defects such as holes or fissures which would have the immediate consequence of short circuiting the generator during the deposition of the negative electrode.

Glasses based on boron oxide, lithium oxide and a lithium salt can be used, for example, glasses containing, in various proportions $B_2O_3$, $Li_2O$ and $Li_rX'$ with X' representing an anion capable of combining with lithium in the form of a salt and where r represents the valency of the anion X'.

As examples of anions X' that may be used, halide and sulphate anions may be mentioned.

One may also use glass conductors based on sulphides, for example glasses with boron sulphide, lithium sulphide and a lithium salt.

When the negative electrode includes other alkali metals or protons, the electrolyte can be made up of glasses of the same type containing the same alkali metal ions or protons.

The electrolyte can be in the form of a layer produced by evaporation under vacuum or cathode sputtering. Preferably, cathode sputtering is used to provide a continuous layer of small thickness, free of defects.

As an electrolyte, one can also use solid materials made of an ion conducting polymer, for example a polymer of the polyoxyethylene type.

The electrochemical generator of the invention can be produced by traditional methods, by successively depositing onto a substrate covered with an electrically conductive layer forming a current collector, a first layer of the amorphous compound $TiO_aS_{3+b}$, a second layer of solid electrolyte and a third layer forming the negative electrode.

According to the invention, the first layer of compound $TiO_aS_{3+b}$ constituting the positive electrode is deposited by cathode sputtering, preferably by radiofrequency cathode sputtering ; this allows one to obtain a thin, compact, continuous and homogeneous layer, having an extremely even profile without any surface porosity.

The thickness of the $TiO_aS_{3+b}$ layer can vary over a wide range. Generally a thin layer having a thickness of from 200 nm to 10 μm is preferred.

This structure is particularly advantageous since the electrolyte deposited afterwards can be in the form of a layer of thickness even smaller than was the case for the "all solid-state" electrochemical generators of the prior art.

Because of this, even when using electrolytes having low ionic conductivity, higher current densities can be obtained than in the electrochemical generators of the prior art by using smaller thickness' of electrolytes without the risk of short-circuits.

Furthermore, by choosing an ion conducting glass, organic or inorganic, with conductivity by alkali metal ions such as lithium, the only mobile element is lithium, the anions being locked in the electrolyte structure. Hence the ionic transport takes place through a single element and the system of thin layers facilitates this transport and allows an improved performance to be provided.

The oxygen in the isotropic material $TiO_aS_{3+b}$ stems from the oxygen present as an impurity in the $TiS_3$ target.

For the production of the electrochemical generator, the second layer of solid electrolyte and the third layer forming the negative electrode can be deposited by the traditional methods that are suitable for the creation of thin layers. In particular, the solid electrolyte can be deposited by cathode sputtering or by evaporation under vacuum and the negative electrode by evaporation under vacuum.

The principle of operation of the generator described above is based on the insertion and the removal of an alkali metal ion or a proton into and from the positive electrode.

The operation of the generator corresponds to the overall reaction:

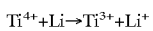

$$Ti^{4+}+Li \rightarrow Ti^{3+}+Li^+$$

This corresponds to an electromotive force of 2.945 volts.

This scheme is theoretical since, on the one hand the activity of the lithium ion can be different and, on the other hand, other ionic species stemming for example from the sulphur can participate in the electrochemical reaction.

Other characteristics and advantages of the invention will become more apparent on reading the description that follows, making reference to the appended drawings and given, it is understood for the purposes of illustration and being non-limitative.

DETAILED DESCRIPTION OF EMBODIMENTS

EXAMPLE 1

Preparation of a Thin Layer of $Ti_{0.2}S_{3.3}$.

One starts with a substrate constituted by a glass plate 3.7×2.5×0.1 cm covered by a layer of chromium of thickness 0.2 $\mu$m, deposited by cathode sputtering and forming a current collector. Onto this substrate, a layer of titanium oxysulphide of composition $Ti_{0.2}S_{3.3}$ is deposited by cathode sputtering from a target of $TiS_3$ 50 mm in diameter, under the following conditions argon pressure: $5\times10^{-1}$ Pa, power: 50 W or 2.54 W/cm$^2$, target voltage: 400 V, distance target-substrate: 5 cm, duration of deposition: 1 hour 20 min, and speed of deposition: 0.5 $\mu$m/h.

In this way one obtains a layer of titanium oxysulphide $Ti_{0.2}S_{3.3}$ the thickness of which, determined with the aid of a profile meter is 0.7 $\mu$m for a mass of 0.7 mg, for a surface area of 4 cm$^2$.

The amorphous structure of the layer is confirmed by X-ray spectrometry, the spectrum not showing any diffraction rays.

Then the composition and the density of the layer are determined by retro-diffusion of $\alpha$ particles (RBS).

Figure 1:
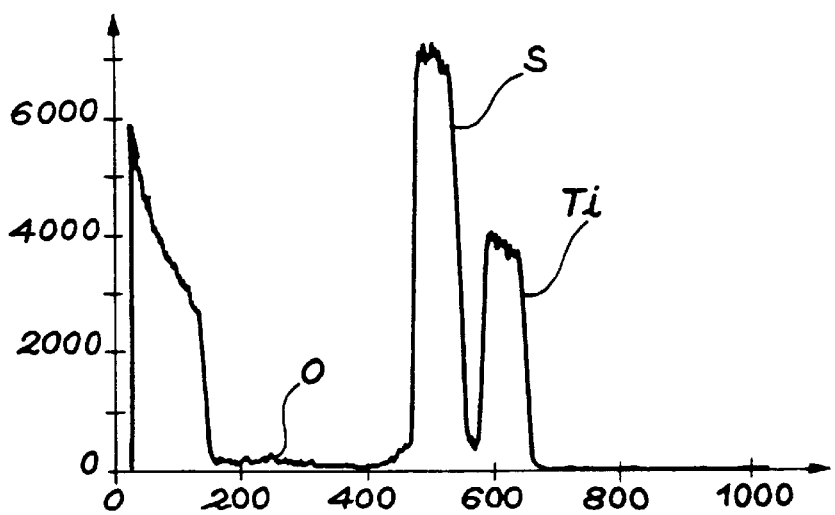
FIG. 1 represents the results of analysis by retro-diffusion of a particles from a layer of the compound $Ti_{0.2}S_{3.3}$ conforming to the invention.

The results obtained are shown in FIG. 1. In this Figure, the three final peaks correspond respectively to O, S and Ti, the peak corresponding to O being very small. By integration of the peaks, the composition of the layer can be deduced and it corresponds to $Ti_{0.2}S_{3.3}$. Hence one should note the low level of oxygen present which it is not possible to remove totally from the layer despite the target only being made up of $TiS_3$ and an increase in the level of sulphur in the layer compared to the target. Leaving a sample in air for several hours does not show any modification of the RBS spectrum, which allows one to conclude that this material is weakly hygroscopic.

The density of the thin layer measured by RBS spectrometry and by weighing is 2.50, it is therefore much lower than that of the massive $TiS_3$ starting material, the density of which is 3.20. This low density is favourable to the insertion of lithium.

In the same way, a layer of $Ti_{0.2}S_{3.3}$ of thickness 2.25 $\mu$m is prepared by cathode sputtering from a $TiS_3$ target and its electronic conductivity is measured at temperatures from 100 to 300 K.

Figure 2:
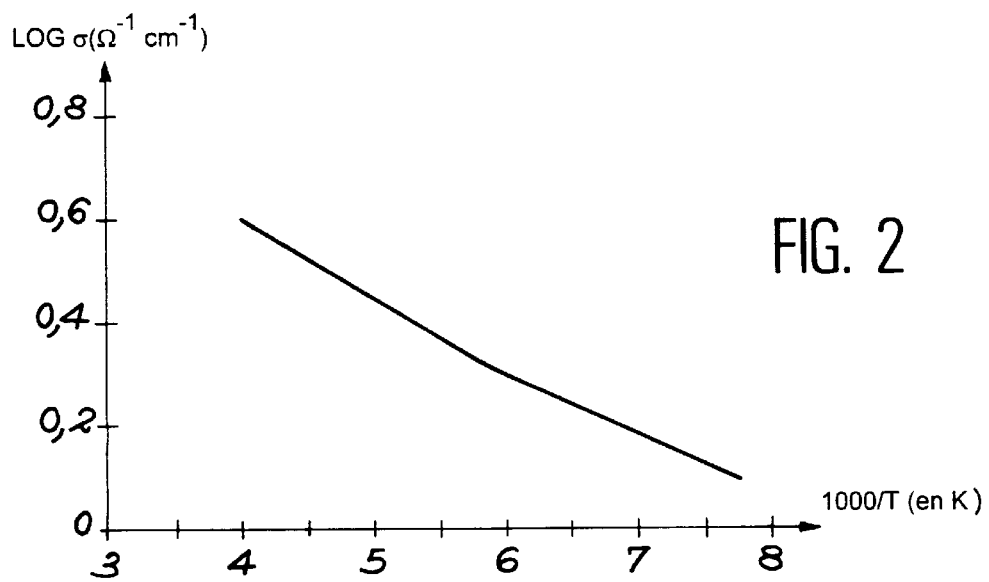
FIG. 2 represents the change in the electronic conductivity (log σ) in relation to the temperature (1000/T in K) for the compound of formula $Ti_{0.2}S_{3.3}$.

FIG. 2 illustrates the results obtained and represents the variation of the logarithm of the conductivity $\sigma$ (in ohm$^{-1}$cm$^{-1}$) in relation to the temperature 1000/T in K. Hence one may note the semi-conductor type behaviour of the layer of $Ti_{0.2}S_{3.3}$ with a value for the conductivity of 0.2 ohm$^{-1}$cm$^{-1}$ at ambient temperature.

EXAMPLE 2

Preparation of an All-solid State Micro-generator.

To produce this micro-generator, one deposits onto the assembly obtained in Example 1, a layer of electrolyte and then a layer of lithium to form the negative electrode.

a) Deposition of the Electrolyte Layer

The electrolyte used is a glass of composition $1B_2O_3$—O, $8Li_2O$—O, $8Li_2SO_4$.

A layer of glass of this composition is deposited by cathode sputtering using the same apparatus as previously and a glass target obtained by pelletising a glass powder of the same composition followed by sintering in air at 600° C. for 6 hours.

The deposition conditions are the following:

argon pressure $10^{-2}$ hPa, power: 100 W or 2.26 W/cm$^2$, target voltage: 250 V, duration: 4 hours In this way a layer of electrolyte is obtained, the thickness of which, measured with a profile meter is 1.5 $\mu$m.

This layer is amorphous to the X-rays.

b) Deposition of the Negative Electrode.

The negative electrode is produced in lithium and is deposited by secondary evaporation under vacuum by electron bombardment. The deposition conditions are the following residual vacuum: $5\times10^{-7}$ hPa distance crucible-substrate: 20 cm duration of the evaporation: 5 minutes.

In this way, a film of lithium is obtained the thickness of which, controlled by a quartz microbalance is about 5 $\mu$m. Then a 1 $\mu$m layer of aluminium is deposited by cathode sputtering to protect the lithium.

Next, the generator is encapsulated using a hydrophobic epoxy resin and then with a sheet of glass to protect it from moisture.

Figure 3:
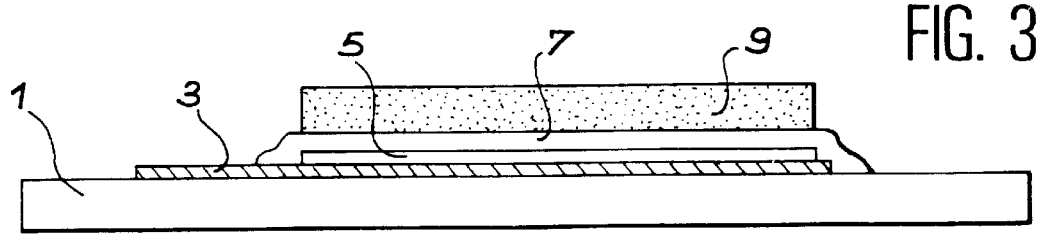
FIG. 3 represents diagramatically in vertical section, an electrochemical generator conforming to the invention.

FIG. 3 represents, in vertical section, the micro-generator obtained in this way. In this Figure, it can be seen that the micro-generator includes a glass substrate (1) covered by a layer (3) of chromium that plays the role of current collector, a layer (5) of titanium oxysulphide $T_{0.2}S_{3.3}$, a layer (7) of glass, ion conducting, electrolyte and the layer (9) of lithium constituting the negative electrode.

The electrochemical properties of this generator are checked by carrying out cycles at constant current and charging and discharging it across resistances of specified values. With this generator, the open circuit electron bombardment. The deposition conditions are the following:

residual vacuum: $5\times10^{-7}$ hPa distance crucible-substrate: 20 cm duration of the evaporation: 5 minutes.

In this way, a film of lithium is obtained the thickness of which, controlled by a quartz microbalance is about 5 $\mu$m. Then a 1 $\mu$m layer of aluminium is deposited by cathode sputtering to protect the lithium.

Next, the generator is encapsulated using a hydrophobic epoxy resin and then with a sheet of glass to protect it from moisture.

FIG. 3 represents, in vertical section, the micro-generator obtained in this way. In this Figure, it can be seen that the micro-generator includes a glass substrate (1) covered by a layer (3) of chromium that plays the role of current collector, a layer (5) of titanium oxysulphide $T_{0.2}S_{3.3}$, a layer (7) of glass, ion conducting, electrolyte and the layer (9) of lithium constituting the negative electrode.

The electrochemical properties of this generator are checked by carrying out cycles at constant current and charging and discharging it across resistances of specified values. With this generator, the open circuit voltage is usually 2.5 V. After several months storage, the voltage remains constant, there is no auto-discharge.

Figure 4:
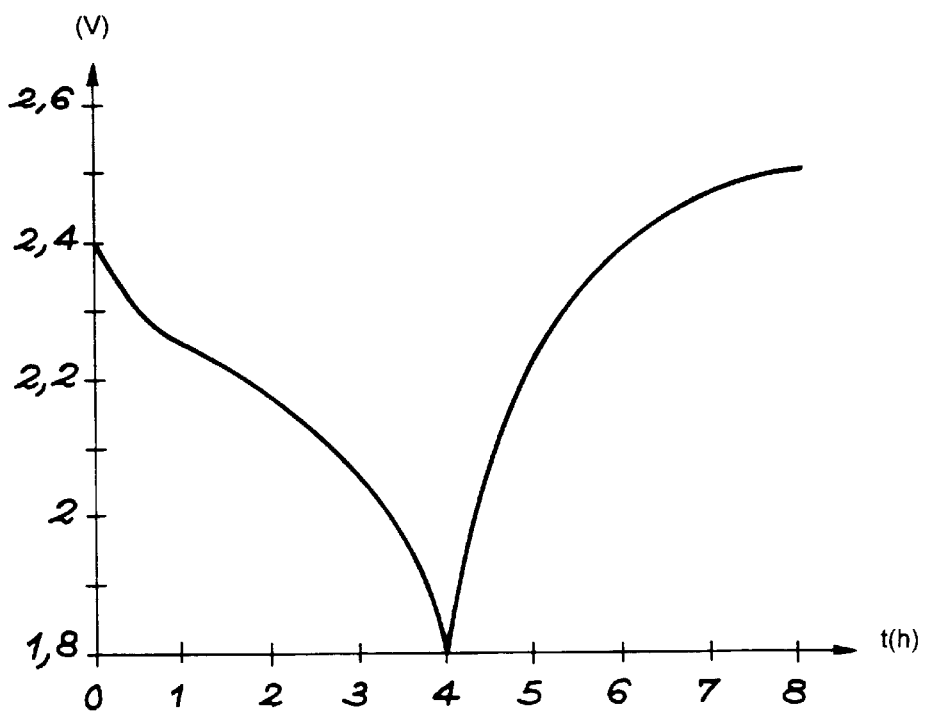
FIG. 4 is a cycle curve of a generator conforming to the invention with a current density of 10 μA/cm².

FIG. 4 shows the curve obtained during cycling of the generator at a current density of 10 $\mu A/cm^2$ between a voltage of 2.5 V and 1.8 V.

Figure 5:
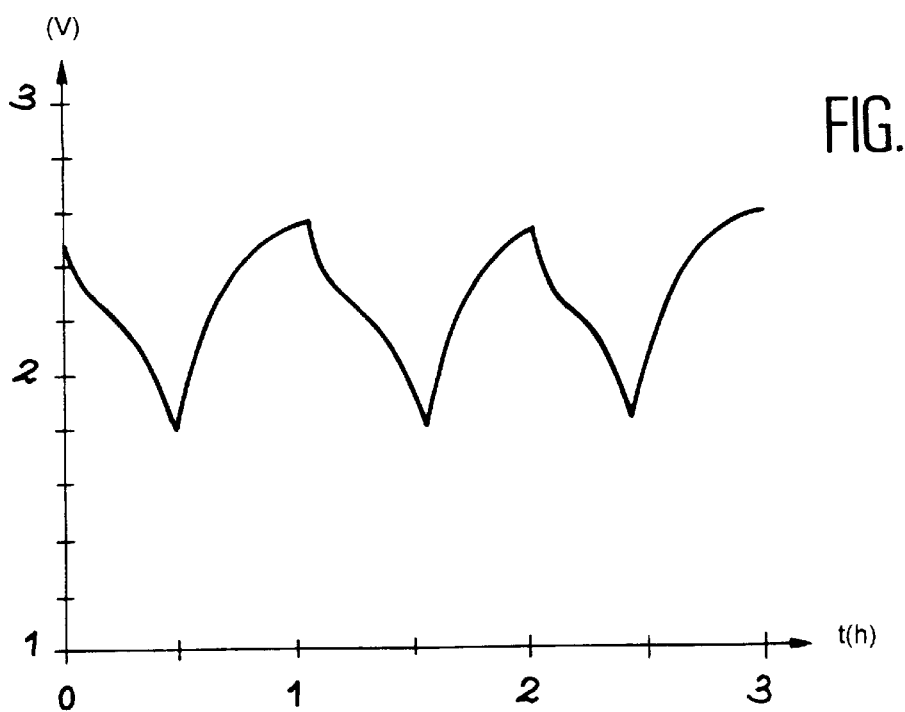
FIG. 5 is a cycle curve of a generator conforming to the invention with a current density of 50 $\mu A/cm^2$.

FIG. 5 shows the cycling curve obtained when the cycling of the generator is carried out between 2.5 V and 1.8 V at a current density of 50 $\mu$A/cm$^2$.

In both case, one notes that the generator behaves ell.

Figure 6:
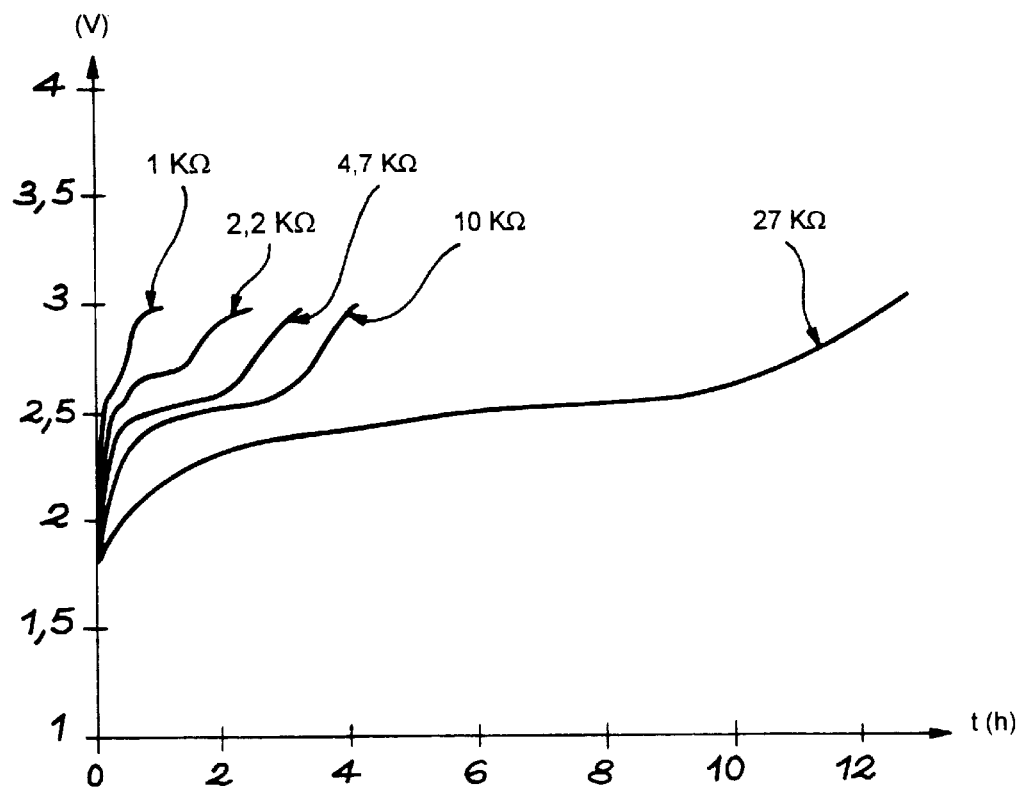
FIG. 6 represents the charge curves, across the resistances whose values go from 1 k$\Omega$ to 27 k$\Omega$, of a generator conforming to the invention.

FIG. 6 represents the charge curves for the same generator across resistances of 1 k$\Omega$, 2.2 k$\Omega$, 4.7 k$\Omega$, 10 k$\Omega$ and 27 k$\Omega$.

Figure 7:
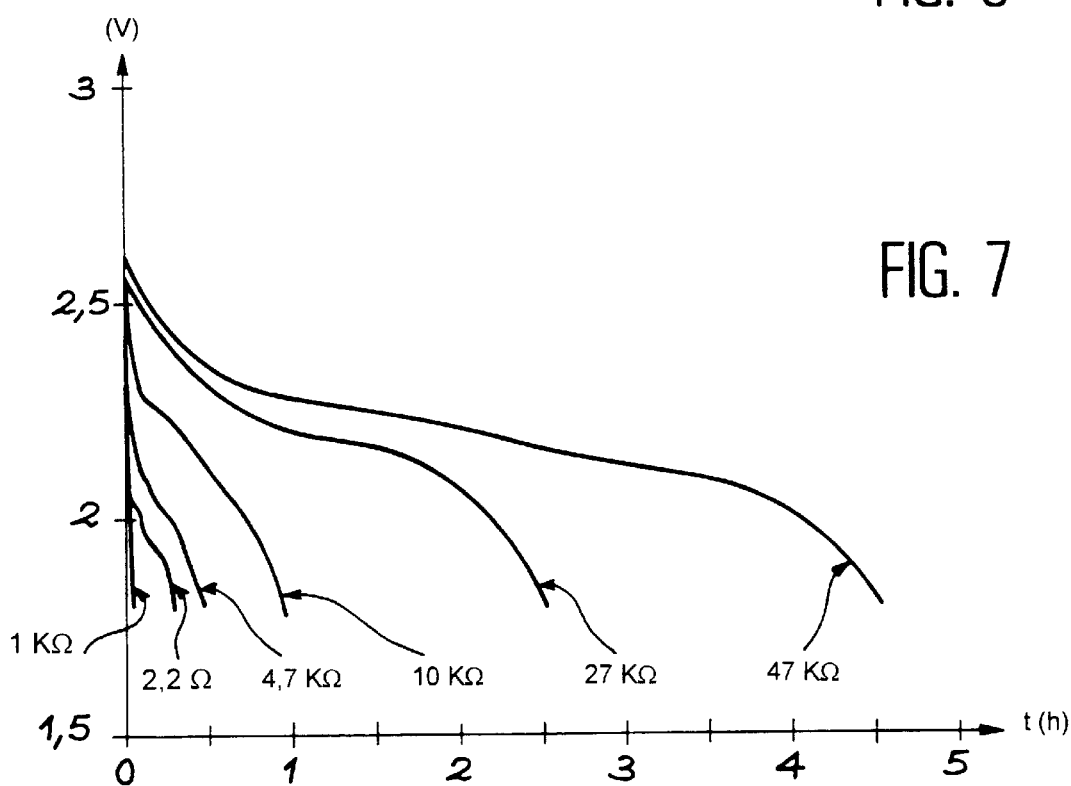
FIG. 7 represents the discharge curves, across the resistances whose values go from 1 k$\Omega$ to 47 k$\Omega$, of a generator conforming to the invention.

FIG. 7 represents the discharge curves across resistances of 1 k$\Omega$, 2.2 k$\Omega$, 4.7 k$\Omega$, 10 k$\Omega$, 27 k$\Omega$ and 47 k$\Omega$. On these curves, it should be noted that for resistance values less than 1 k$\Omega$, it is the internal resistance of the generator that determines the current density, and this is close to 0.5 mA/cm$^2$. For such a current density, the voltage drops rapidly. With a resistance of 1 k$\Omega$, the generator is recharged in less than one hour.

For a current density of 10 $\mu$A/cm$^2$, the capacity per unit mass of the generator is of the order of 300 Ah/kg and the energy per unit mass is close to 650 Wh/kg.

For purposes of comparison, it should be made clear that in the case of the prior art generator (WO-A-90/05387) with cycling at a current density of 10 $\mu$A/cm$^2$ between 2.5 volts and 1 volt, a capacity per unit mass of 125 Ah/kg and an energy per unit mass of 230 Wh/kg are obtained.

Hence it should be noted that the electrochemical generator of the invention has greatly superior performance, its capacity per unit mass being increased by more than 50%. The improvement is very great in comparison with the generator of the prior art.

In addition, the invention permits the production of TiS$_3$ targets of a large size for industrial scale application for the manufacture of thin layer electrodes.

What is claimed is:

1. A positive electrode material for an electrochemical generator made up of a thin layer of an amorphous compound represented by the formula:

$TiO_aS_{3+b}$ wherein $0<a\leq 0.5$ $0<b\leq 0.7$.

2. The material according to claim 1, wherein the amorphous compound is represented by the formula:

$TiO_{0.2}S_{3.3}$.

3. A method of preparation of a positive electrode of an electrochemical generator, comprising depositing onto a substrate a thin layer of an amorphous compound represented by the formula:

$TiO_aS_{3+b}$ wherein $0<a\leq 0.5$ $0<b\leq 0.7$, by radio frequency cathode sputtering from a TiS$_3$ target.

4. The method according to claim 3, in which the substrate is an insulating substrate covered by a layer of electrically conducting material.

5. The method according to claim 4, in which the electrically conducting material is chromium and in which the chromium is deposited onto the insulating substrate by cathode sputtering.

6. An electrochemical generator comprising a positive electrode, a negative electrode capable of liberating a proton or an alkali metal ion and an ion conducting electrolyte arranged between the two electrodes, wherein the positive electrode is formed from a thin layer of an amorphous compound represented by the formula $TiO_aS_{3+b}$, wherein $0<a\leq 0.5$ $0<b\leq 0.7$ said layer being arranged on a substrate.

7. The generator according to claim 6, wherein the amorphous compound is represented by the formula:

$TiO_{0.2}S_{3.3}$.

8. The generator according to claim 6, wherein the substrate is an insulating substrate covered by a layer of electrically conducting material on which is arranged the thin layer of the compound represented by $TiO_aS_{3+b}$.

9. The generator according to claim 8, wherein the electrically conducting material is chromium.

10. The generator according to claim 6, wherein the negative electrode is made of lithium.

11. The generator according to claim 6, wherein the electrolyte is a glass which conducts lithium ions.

12. The generator according to claim 11, wherein the glass conductor is a glass based on a lithium-boron compound having the composition:

$1B_2O_3$—O, $8Li_2O$—O, $8Li_2SO_4$.

13. The generator according to claim 7, wherein the substrate is an insulating substrate covered by a layer of electrically conducting material on which is arranged the thin layer of the compound represented by the formula $TiO_aS_{3+b}$.

14. The generator according to claim 13, wherein the electrically conducting material is chromium.

15. The generator according to claim 7, wherein the negative electrode is made of lithium.

16. The generator according to claim 7, wherein the electrolyte is a glass which conducts lithium ions.

17. The generator according to claim 16, wherein the glass conductor is a glass based on a lithium-boron compound having the composition:

$1B_2O_3$—O, $8Li_2O$—O, $8Li_2SO_4$.

* * * * *

UNITED STATES PATENT AND TRADEMARK OFFICE
CERTIFICATE OF CORRECTION

PATENT NO. : 6,355,376 B1
DATED : March 12, 2002
INVENTOR(S) : Meunier

Page 1 of 1

It is certified that error appears in the above-identified patent and that said Letters Patent is hereby corrected as shown below:

<u>Title page,</u>
Item [73], the Assignee information should read:

-- [73]  Assignee:  Centre Nationale de la Recherche Scientifique, Paris (FR) --

The PCT information has been ommitted. The PCT information, Items [22], [86] and [87] should read:

-- [22]  PCT Filed:      Apr. 21, 1998
   [86]  PCT No.:        PCT/FR98/00799
         §371 Date:      Oct. 22, 1999
         §102(e) Date:   Oct. 22, 1999
   [87]  PCT Pub. No.:   WO 98/48467
         PCT Pub. Date:  Oct. 29, 1998 --

Signed and Sealed this

Third Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,355,376 B1
DATED : March 12, 2002
INVENTOR(S) : Meunier

It is certified that error appears in the above-identified patent and that said Letters Patent is hereby corrected as shown below:

<u>Title page,</u>
Item [73], the Assignee information should read:

-- [73]   Assignee:   Centre Nationale de la Recherche Scientifique, Paris (FR) --

The PCT information has been omitted. The PCT information, Items [22], [86] and [87] should read:

-- [22]   PCT Filed:          Apr. 21, 1998
   [86]   PCT No.:            PCT/FR98/00799
          §371 Date:          Oct. 22, 1999
          §102(e) Date:       Oct. 22, 1999
   [87]   PCT Pub. No.:       WO 98/48467
          PCT Pub. Date:      Oct. 29, 1998 --

This certificate supersedes Certificate of Correction issued September 3, 2002.

Signed and Sealed this

Fifth Day of November, 2002

*Attest:*

*Attesting Officer*

JAMES E. ROGAN
*Director of the United States Patent and Trademark Office*